(12) United States Patent
Kawai et al.

(10) Patent No.: US 8,141,386 B2
(45) Date of Patent: *Mar. 27, 2012

(54) METHOD FOR FABRICATING A GLASS SUBSTRATE FOR AN INFORMATION RECORDING MEDIUM, AND MAGNETIC DISK USING THE SAME

(75) Inventors: Hideki Kawai, Kobe (JP); Yukitoshi Nakatsuji, Sakai (JP); Hiroaki Sawada, Sakai (JP); Shinichi Saeki, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 11/824,768

(22) Filed: Jul. 2, 2007

(65) Prior Publication Data
US 2008/0014468 A1   Jan. 17, 2008

(30) Foreign Application Priority Data
Jul. 3, 2006   (JP) .................................. 2006-183097

(51) Int. Cl.
C23G 1/00 (2006.01)
C03C 3/085 (2006.01)
C03C 3/095 (2006.01)

(52) U.S. Cl. ............... 65/31; 134/3; 216/99; 428/848.8; 501/69

(58) Field of Classification Search ............... 428/847.2, 428/847.9, 846.9, 848.8; 65/31, 88; 216/97, 216/100, 99, 1; 451/41; 369/275.1, 272.1, 369/215; 360/215; 501/9, 69; 134/2, 3, 134/42
See application file for complete search history.

(56) References Cited

U.S. PATENT DOCUMENTS

| | | | |
|---|---|---|---|
| 6,553,788 B1* | 4/2003 | Ikeda et al. | 65/31 |
| 2001/0055938 A1* | 12/2001 | Fujimura et al. | 451/41 |
| 2002/0016132 A1 | 2/2002 | Isono et al. | |
| 2002/0193233 A1 | 12/2002 | Kishimoto et al. | |
| 2005/0008822 A1 | 1/2005 | Miyamoto et al. | |
| 2005/0052987 A1* | 3/2005 | Sonoda et al. | 369/283 |
| 2005/0074635 A1* | 4/2005 | Mitani et al. | 428/847.2 |
| 2005/0096210 A1* | 5/2005 | Kawai | 501/69 |
| 2005/0215414 A1* | 9/2005 | Kawai | 501/69 |
| 2006/0062129 A1 | 3/2006 | Saito et al. | |
| 2008/0026261 A1 | 1/2008 | Kawai et al. | |

FOREIGN PATENT DOCUMENTS
JP   2000-311336   11/2000

(Continued)

OTHER PUBLICATIONS

Translation JP 2002-074653 Honda et al; Mar. 2002.*

(Continued)

Primary Examiner — Kevin M. Bernatz
Assistant Examiner — Louis Falasco
(74) Attorney, Agent, or Firm — Brinks Hofer Gilson & Lione

(57) ABSTRACT

A method for fabricating a glass substrate containing $SiO_2$ as a main ingredient thereof for an information recording medium which ensures removal of abrasive or foreign mater adhered to the glass substrate without complicating a cleaning step, involves, after a polishing step, keeping the surface of the glass substrate in contact with a liquid having a Si element elution in a range from 100 to 10 000 ppb/mm² before a scrub-cleaning step.

4 Claims, 1 Drawing Sheet

FOREIGN PATENT DOCUMENTS

| | | |
|---|---|---|
| JP | 2001-316133 | 11/2001 |
| JP | 2001-344743 | 12/2001 |
| JP | 2002-074653 | 3/2002 |
| JP | 2002-329629 | 11/2002 |
| JP | 2003-036566 | 2/2003 |
| JP | 2003-146667 | 5/2003 |
| JP | 2003-228824 | 8/2003 |
| JP | 2003-346316 | 12/2003 |
| JP | 2004-145958 | 5/2004 |
| WO | WO 2004/042708 A1 | 5/2004 |

OTHER PUBLICATIONS

Translation JP 2003-228824 Koyama et al; Aug. 2003.*
Translation (machine) Koji et al, JP 2000-311336, Nov. 2000.*

International Search Report in International Application No. PCT/JP2007/062868 dated Oct. 2, 2007, 4 pages.
Office Action dated Aug. 18, 2009 issued by the Japanese Patent Office in related Japanese Patent Application No. 2008-523653 (includes English translation).
Non-final Office Action dated Jun. 10, 2009 issued in related U.S. Appl. No. 11/824,775.
Final Office Action dated Dec. 3, 2009 issued in related U.S. Appl. No. 11/824,775.
Non-final Office Action dated Jul. 9, 2009 issued in related U.S. Appl. No. 11/824,770.
Final Office Action dated Mar. 25, 2010 issued in related U.S. Appl. No. 11/824,770.

* cited by examiner

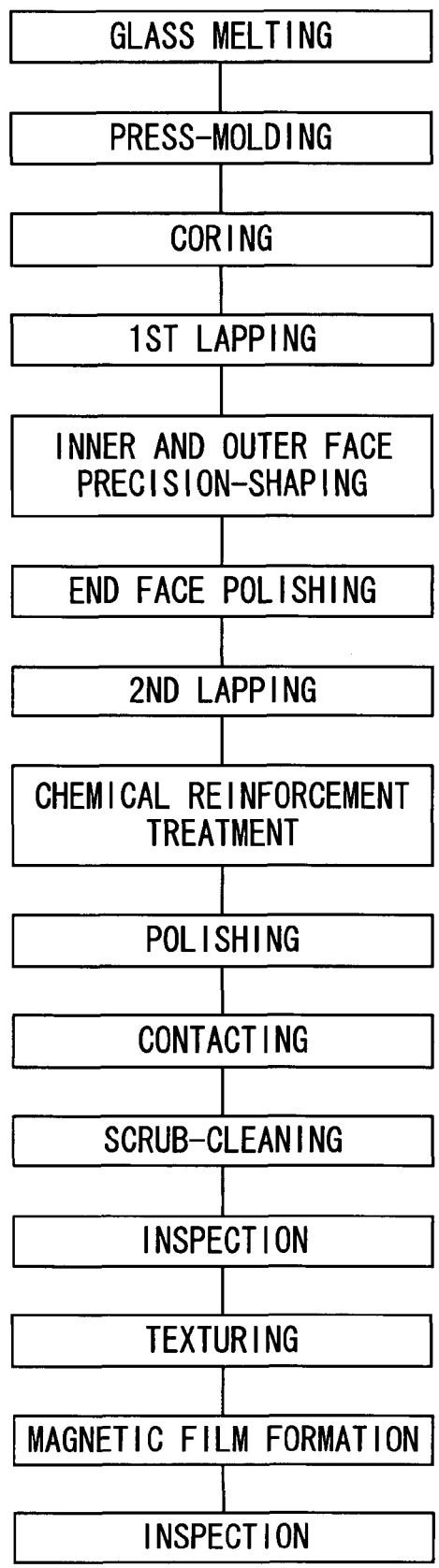

METHOD FOR FABRICATING A GLASS SUBSTRATE FOR AN INFORMATION RECORDING MEDIUM, AND MAGNETIC DISK USING THE SAME

This application is based on Japanese Patent Application No. 2006-183097 filed on Jul. 3, 2006, the contents of which are hereby incorporated by reference.

BACKGROUND OF THE INVENTION

1. Field of the Invention

The present invention relates to a method for fabricating a glass substrate, and to a magnetic disk using it; more particularly, the present invention relates to a method for fabricating a glass substrate for an information recording medium which includes a step of polishing the glass substrate and a step of cleaning the polished glass substrate by scrubbing, and to a magnetic disk using it.

2. Description of Related Art

Conventionally, as substrates for magnetic disks, there have generally been used aluminum substrates in stationary devices such as desktop computers and servers, and glass substrates in portable devices such as notebook computers and mobile computers. One disadvantage with aluminum substrates is that they are easy to deform and are not hard enough, offering not quite satisfactory smoothness on the substrate surface after polishing. Another disadvantage is that, if a magnetic head happens to touch a magnetic disk, the magnetic film on an aluminum substrate is prone to exfoliate from the substrate. Under this background, it is expected that glass substrates, less prone do deformation, offering better surface smoothness, and affording higher mechanical strength, will be increasingly used not only in portable but also in stationary devices and in other home information appliances.

The recording capacity of a magnetic disk can be increased by reducing the distance between the surface thereof and a magnetic head. Inconveniently, however, with a reduced distance between a magnetic head and the surface of a magnetic disk, if there is an abnormal projection formed on or foreign matter adhered to the surface of a glass substrate, the magnetic head collides with the projection or foreign matter. Thus, to make it possible to increase the recording capacity of a magnetic disk by reducing the distance from the surface thereof to a magnetic head, it is necessary to eliminate formation of projections on and adhesion of foreign matter to the surface of a glass substrate altogether. For this purpose, it is conventional practice to polish the surface of a glass substrate with abrasive such as cerium oxide to make it smooth enough.

Disadvantageously, however, polishing a glass substrate with abrasive may leave the abrasive firmly adhered to the surface thereof, and even when the glass substrate surface is thereafter cleaned by scrubbing, it is difficult to remove the abrasive firmly adhered thereto. Moreover, forming a magnetic recording layer on the glass substrate surface with the abrasive firmly adhered thereto is likely to produce pin holes in the layer, destabilize the floating characteristics of the head, and otherwise significantly degrade the magnetic recording characteristics.

As a solution, for example, JP-A-2002-074653 proposes performing, after a polishing step, three types of cleaning, namely ultrasonic cleaning using a detergent, cleaning by scrubbing, and ultrasonic cleaning using pure water. As another solution, JP-A-2003-228824 proposes cleaning a glass substrate by a combination of cleaning by scrubbing and cleaning using a water solution of carbon dioxide.

Supposedly, these conventionally proposed technologies help to a certain degree to remove the abrasive adhered to a glass substrate. Disadvantageously, however, the former technology, requiring three types of cleaning, complicates the cleaning step and lowers productivity; likewise, the latter technology, requiring the introduction of equipment for maintaining and managing the solubility of the gas, complicates the cleaning step and lowers productivity.

SUMMARY OF THE INVENTION

In view of the above described problems, it is an object of the present invention to provide a method for fabricating a glass substrate that, without making a cleaning step complicated, ensures removal of abrasive and foreign matter adhered to the glass substrate after a polishing step and leaves the glass substrate after the cleaning step clean and free of residual cleaning liquid ingredients.

Another object of the present invention is to provide a magnetic disk that allows the recording capacity thereof to be increased through a reduction of the distance between a magnetic head and the surface of the magnetic disk.

According to a first aspect of the present invention, a method for fabricating a glass substrate for an information recording medium containing $SiO_2$ as a main ingredient thereof, including a step of, after the step of polishing, keeping the surface of the glass substrate in contact with a liquid having a Si element elution in the range from 100 to 10 000 $ppb/mm^2$ before the step of cleaning by scrubbing, is provided.

According to a second aspect of the present invention, in the above method, the step of keeping the surface of the glass substrate in contact with the liquid may be performed inside scrub-cleaning equipment.

According to a third aspect of the present invention, in the above method, in the step of keeping the surface of the glass substrate in contact with the liquid, the liquid may be supplied by use of a mechanism for supplying a scrub-cleaning liquid.

According to a fourth aspect of the present invention, in the above method, the surface of the glass substrate may be kept in contact with the liquid for duration of 20 seconds or more.

According to a fifth aspect of the present invention, in the above method, the surface of the glass substrate may be kept in contact with the liquid for duration in the range from 30 seconds to 1 000 seconds.

According to a sixth aspect of the present invention, in the above method, the surface of the glass substrate is kept in contact with the liquid with the glass substrate immersed in the liquid which is collected.

According to a seventh aspect of the present invention, a magnetic disk having a magnetic recording layer formed on a glass substrate for an information recording medium and is fabricated by the fabricating method according to claim 1, is provided.

In a method for fabricating a glass substrate according to the present invention, before a polishing step, the surface of the glass substrate is kept in contact with a liquid having a Si element elution in the range from 100 to 10 000 $ppb/mm^2$ before a scrub-cleaning step. This allows the glass substrate surface to be slightly eroded, and thereby allows abrasive and foreign matter firmly adhered to the glass substrate surface to somewhat float, ensuring that the abrasive and foreign matter is removed by scrub-cleaning. Moreover, keeping the glass substrate in contact with the liquid helps prevent abrasive from firmly adhering to the glass substrate during drying after the polishing step, and thus helps prevent adhesion of additional foreign matter to the glass substrate surface.

By performing the step of keeping the surface of the glass substrate in contact with the liquid inside scrub-cleaning equipment, it is possible to simplify the fabrication process.

By supplying the liquid by use of a mechanism for supplying a scrub-cleaning liquid in the step of keeping the surface of the glass substrate in contact with the liquid, it is possible to simplify the fabrication process.

By keeping the surface of the glass substrate in contact with the liquid for duration of 20 seconds or more, it is possible to obtain the full benefits of the present invention. More preferably, by keeping the surface of the glass substrate in contact with the liquid for duration in the range from 30 seconds to 1 000 seconds, it is possible to more effectively obtain the benefits of the present invention.

By keeping the surface of the glass substrate in contact with the liquid with the glass substrate immersed in the liquid which is collected, it is possible to more effectively ensure that abrasive and foreign matter firmly adhered to the glass substrate is removed by scrub-cleaning.

With a magnetic disk according to the present invention, which has a magnetic recording layer formed on a glass substrate fabricated by the method described above, it is possible to reduce the distance between a magnetic head and the surface of the magnetic disk, and thus to increase the recording capacity.

BRIEF DESCRIPTION OF THE DRAWINGS

FIG. 1 is a diagram to show an example of a process, according to the present invention, for fabricating a glass substrate and a magnetic disk.

DETAILED DESCRIPTION OF PREFERRED EMBODIMENTS

FIG. 1 shows an outline of, in one part, an example of a process for fabricating a glass substrate involving, between a polishing step and a scrub-cleaning step, keeping the glass substrate in contact with a liquid according to the present invention and, in the other part, an example of a process for fabricating a magnetic disk using the so fabricated glass substrate. First, a glass material is melted (a glass melting step). The melted glass is then poured into a lower mold, and is then molded by being pressed with an upper mold into a disk-shaped glass substrate precursor (a press-molding step). Here, the disk-shaped glass substrate precursor may be formed, instead of by press-molding, by cutting it with an abrasive grindstone out of sheet glass formed, for example, by down-drawing or floating.

There is no particular restriction on the material of the glass substrate of the present invention. Examples of the material include: soda-lime glass, of which the main ingredients are silicon dioxide, sodium oxide, and calcium oxide; aluminosilicate glass, of which the main ingredients are silicon dioxide, aluminum oxide, and $R_2O$ (where R=K, Na, Li); borosilicate glass; lithium oxide-silicon dioxide glass; lithium oxide-aluminum oxide-silicon dioxide glass; R'O-aluminum oxide-silicon dioxide glass (where R'=Mg, Ca, Sr, Ba). Any of these glass materials may have zirconium oxide, titanium oxide, or the like added thereto.

There is no particular restriction on the size of the glass substrate. The method of the present invention is applicable to 2.5-inch, 1.8-inch, 1-inch, and 0.85-inch disks and even disks with smaller diameters, and to 2 mm thick, 1 mm thick, and 0.63 mm thick disks and even disks with smaller thicknesses.

As necessary, in a central portion of the press-molded glass substrate precursor, a hole is formed with a core drill or the like (a coring step). Then, in a first lapping step, the surface of the glass substrate on both sides is ground, and thereby the overall shape of the glass substrate is preliminarily adjusted in terms of the parallelism, flatness, and thickness thereof. Next, the outer and inner circumferential edge faces of the glass substrate are ground and chamfered, and thereby fine adjustments are made in the exterior dimensions and roundness of the glass substrate, the inner diameter of the hole, and the concentricity between the glass substrate and the hole (an inner and outer face precision-shaping step). Then, the outer and inner circumferential edge faces of the glass substrate are polished to remove minute scratches and the like (an end face polishing step).

Next, the surface of the glass substrate on both sides is ground again, and thereby fine adjustments are made in the parallelism, flatness, and thickness of the glass substrate (a second lapping step). Then, to improve the mechanical strength of the glass substrate, it is subjected to chemical reinforcement treatment. In the chemical reinforcement treatment here, the glass substrate is immersed in a chemical reinforcement liquid collected in a chemical reinforcement treatment vat so that the alkali metal ions on the glass substrate surface are substituted by alkali metal ions with larger ion diameters. This produces compression strain and thereby improves mechanical strength.

Next, the surface of the glass substrate on both sides is polished, and thereby the surface irregularities on the glass substrate surface are leveled. As necessary, the surface of the glass substrate on both sides may be further polished with abrasive with a different grain size.

One of the distinctive features of the fabricating method of the present invention is that the glass substrate after the polishing step is kept in contact with a liquid having a Si element elution in a predetermined range. This allows abrasive and foreign matter firmly adhered to the glass substrate surface to somewhat float, and thereby ensures that the abrasive or foreign matter is removed by scrub-cleaning in the next step. Moreover, since the glass substrate is brought into contact with the liquid immediately after the polishing step, it is possible to effectively prevent adhesion of foreign matter to the glass substrate after the polishing step.

In the present invention, the elution of the Si element into the liquid is measured in the following manner. First, a reference glass substrate is prepared from aluminoborosilicate glass containing $SiO_2$ as a main ingredient thereof and having the following composition: 65% by weight of $SiO_2$, 15% by weight of $Al_2O_3$, 5% by weight of $B_2O_3$, 2% by weight of $Li_2O$, 7% by weight of $Na_2O$, and 6% by weight of $K_2O$. The main surface of this substrate is polished with cerium oxide to have a surface roughness Ra of 20 Å or less, and is then cleaned, the reference glass substrate eventually having an outer diameter of 65 mm, an inner diameter of 20 mm, and a thickness of 0.635 mm. This glass substrate is immersed in 250 ml of the liquid kept at 60° C. for five hours. Then, on an ICP atomic emission spectrometer, the amount of the Si element in the elution liquid is measured. In advance, the amount of the Si element in the liquid before the immersion of the glass substrate is measured likewise so that this amount is subtracted from that measured after immersion, and, based on the result of this subtraction, the Si element elution of the liquid is calculated.

The cleaning liquid used in the present invention has a Si element elution in the range from 100 to 10 000 ppb/mm². If the cleaning liquid has a Si element elution less than 100 ppb/mm², it is impossible to allow the abrasive and foreign matter firmly adhered to the glass substrate surface to sufficiently float, and thus it is impossible to perform scrub-cleaning effectively. On the other hand, a Si element elution more than 10 000 ppb/mm² causes the glass substrate surface to be eroded too quickly, and thus makes the control of the cleaning duration difficult, resulting in a rough surface; it also leaves a residue on the surface, possibly leading to degraded magnetic characteristics in the magnetic layer that will be formed on the substrate. A more preferable range of the Si element elution of the cleaning liquid is from 200 to 3 000 ppb/mm². Examples of the cleaning liquid used in the present invention include: hydrofluoric acid, sodium hydroxide, and sodium silicate. Among these, hydrofluoric acid is particularly suitable because it has a high Si element elution.

In the present invention, there is no particular restriction on the duration for which the glass substrate is kept in contact with the liquid. To let the liquid exert a slight eroding action adequate to allow the abrasive and foreign matter firmly adhered to the glass substrate surface to somewhat float, it is preferable that the duration of contact be 20 seconds or more. On the other hand, the longer the duration of the contact of the glass substrate with the liquid, the easier the removal of the abrasive and foreign matter from the glass substrate surface, but the more likely the deposition of cleaning liquid ingredients and the lower the productivity of the glass substrate. Thus, a preferable range of the duration of contact is from 30 to 1 000 seconds. For effective prevention of adhesion of foreign matter to the glass substrate surface, it is recommended that the glass substrate be kept in contact with the liquid from immediately after polishing until immediately before scrub-cleaning. It is advisable that, with the glass substrate set in scrub-cleaning equipment, the liquid be supplied by use of a mechanism for supplying a scrub-cleaning liquid, because doing so makes it possible to keep the glass substrate in contact with the liquid until immediately before the scrub-cleaning step.

As the method for contacting the glass substrate surface with the liquid, any conventionally known one may be adopted. Examples of such methods include: one in which the glass substrate is immersed in the liquid collected in a container; one in which the glass substrate is sprayed with the liquid; and one in which the glass substrate is coated with cloth impregnated with the liquid. Among these, the method involving immersion of the glass substrate in the liquid is preferable because it ensures that the entire glass substrate surface is evenly kept in contact with the liquid.

After the glass substrate is immersed in a predetermined liquid for a predetermined duration, it is then cleaned by scrubbing to remove the abrasive and foreign matter adhered to the surface thereof.

In the present invention, the step of polishing the glass substrate and the step of cleaning it by scrubbing are achieved with conventionally known technologies as they are. To polish the glass substrate, for example, two rotatable surface plates are arranged opposite each other, and pads are attached one to each of the faces thereof that face each other; then, the glass substrate is placed between the two pads, and the surface plates are rotated with the glass substrate surface kept in contact with the pads, while abrasive is supplied to the glass substrate surface. Examples of the abrasive include: cerium oxide, zirconium oxide, aluminum oxide, manganese oxide, colloidal silica, and diamond. Among these, using cerium oxide is recommendable because it reacts well with glass and produces a smooth polished surface in a short time.

On the other hand, to perform scrub-cleaning, for example, the glass substrate is held between a pair of sponge rollers, and the sponge rollers are rotated in opposite directions relative to each other, while a cleaning liquid is supplied; simultaneously, the glass substrate surface itself is also moved up and down; thus, the entire surface of the glass substrate on both sides is cleaned. Scrubbing may be achieved with any other members than sponge rollers, such as brushes or pads. Examples of the material of such scribing members include: polyvinyl alcohol, polyurethane, vinyl alcohol, polypropylene, and nylon.

As necessary, the glass substrate that has undergone scrub-cleaning is then subjected to drying (unillustrated). Specifically, for drying, the glass substrate is immersed in IPA (isopropyl alcohol) so that cleaning liquid ingredients dissolve into IPA and that the liquid coating the substrate surface is substituted by IPA; thereafter, while the glass substrate is exposed to IPA vapor, IPA is vaporized and thereby the glass substrate is dried. The glass substrate may be dried otherwise than just described; it may be dried by any conventionally known method as one for drying a glass substrate, such as spin drying and air-knife drying. Thereafter, as necessary, the glass substrate is inspected.

Next, the glass substrate is subjected to texturing. In the texturing here, stripes in the shape of concentric circles are formed on the glass substrate surface by polishing using tape. Texturing gives a magnetic disk medium magnetic anisotropy; this improves the magnetic characteristics thereof as a magnetic disk, and also prevents attraction between a magnetic head and the surface of the magnetic disk when a hard disk drive is out of operation.

Here, a texturing liquid is used that has abrasive particles dispersed evenly in a liquid in a way that the abrasive particles do not precipitate while the liquid is in storage. An example of such a texturing liquid is slurry having about 0.01% to 5% by weight of abrasive particles dispersed in water solution containing about 1% to 25% by weight of a glycol compound surfactant such as polyethylene glycol or polypropylene glycol.

An example of the abrasive particles is monocrystalline or polycrystalline diamond particles. Diamond particles have a regular particles shape, have a uniform particle size and shape, are hard, and are excellently resistant to chemicals and heat. In particular, polycrystalline diamond particles have, compared with monocrystalline counterparts, a more round particle shape, with rounded corners, and are widely used as abrasive particles for ultraprecision polishing.

It is preferable that, after texturing, the topmost surface of the glass substrate have a surface roughness Ra of 0.3 nm or less. In the magnetic disk as an end product, a surface roughness larger than 0.3 nm here makes it impossible to reduce the distance between a magnetic head and the surface of the magnetic disk, and thus to increase the recording capacity of the magnetic disk.

Next, on the glass substrate fabricated as described above, a magnetic film is formed. The magnetic film can be formed by a conventionally known method, for example, by spin-coating the substrate with a thermosetting resin having magnetic particles dispersed therein, by sputtering, or by electroless plating. Spin-coating provides a film thickness of about 0.3 μm to 1.2 μm, sputtering provides a film thickness of about 0.04 μm to 0.08 μm, and electroless plating provides a film thickness of about 0.05 μm to 0.1 μm. To reduce the film thickness and to obtain a high density, it is preferable to adopt sputtering or electroless plating.

There is no particular restriction on the material of the magnetic film; it may be any conventionally known magnetic material. To obtain a high coercivity, it is suitable to use, for example, an alloy of Co that is based on Co, having high crystal anisotropy, and that has Ni or Cr added thereto to adjust the residual flux density. Specifically, examples of such magnetic materials containing Co as a main ingredient thereof include: CoPt, CoCr, CoNi, CoNiCr, CoCrTa, CoPtCr, CoNiPt, CoNiCrPt, CoNiCrTa, CoCrPtTa, CoCrPtB, and CoCrPtSiO. To reduce noise, the magnetic film may be divided with a non-magnetic film (e.g., Cr, CrMo, or CrV) to have a multiple-layer structure (e.g., CoPtCr/CrMo/CoPtCr, CoCrPtTa/CrMo/CoCrPtTa). Other than the magnetic materials mentioned above, it is also possible to use: a ferrite material; an iron-rare earth metal material; or a granular material having magnetic particles of Fe, Co, FeCo, CoNiPt, or the like dispersed in a non-magnetic film of $SiO_2$, BN, or the like. The magnetic film may be for either of the longitudinal and perpendicular types of recording.

For smoother sliding of a magnetic head, a thin coat of a lubricant may be applied to the surface of the magnetic film. An example of the lubricant is perfluoropolyether (PFPE), a liquid lubricant, diluted with a solvent of the Freon family or the like.

As necessary, an underlayer or a protective layer may additionally be provided. In a magnetic disk, what underlayer to provide is determined to suit the magnetic film. The material of the underlayer is, for example, one or more selected from the group of non-magnetic metals including Cr, Mo, Ta, Ti, W, V, B, Al, and Ni. With a magnetic film containing Co as a main ingredient thereof, it is preferable to use the simple substance of or an alloy of Cr. The underlayer is not limited to one having a single layer, but may be one having a multiple-layer structure having a plurality of layers of the same material or of different materials laid on one another. Examples of multiple-layer underlayers include: Cr/Cr, Cr/CrMo, Cr/CrV, NiAl/Cr, NiAl/CrMo, and NiAl/CrV.

Examples of protective layers for preventing wear and corrosion of the magnetic film include: a Cr layer, a Cr alloy layer, a carbon layer, a carbon hydride layer, a zirconia layer, and a silica layer. Any of these protective layers can be formed continuously with the underlayer, the magnetic film, etc. on in-line sputtering equipment. Any of those protective layers may be provided in a single layer, or more than one of them, of the same material or of different material, may be provided in multiple layers. In addition to, or instead of, this or these protective layers, another protective layer may be formed. For example, instead of the above protective layers, a silicon dioxide ($SiO_2$) layer may be formed by applying to the top of the Cr layer minute particles of colloidal silica dispersed in tetraalkoxysilane diluted with a solvent of the alcohol family and then baking the applied layer.

PRACTICAL EXAMPLE 1 (P. E. 1)

An aluminosilicate glass substrate containing as glass ingredients thereof 66% by weight of $SiO_2$ and 15% by weight of $Al_2O_3$ was kept in contact with the following liquid, by spraying the glass substrate with the liquid on spraying equipment for 300 seconds before the start of the scrubbing step: a liquid obtained by diluting an alkaline liquid containing NaOH as a main ingredient thereof with ultrapure water so as to have an Si element elution of 200 ppb/mm². Subsequently, by use of the same liquid as a cleaning liquid, the glass substrate was cleaned by scrubbing on a roll-scrub cleaning machine, and was then dried. The results are shown in Table 1.

PRACTICAL EXAMPLE 2 (P. E. 2)

A substrate of non-alkali glass containing as glass ingredients thereof 60% by weight of $SiO_2$, 10% by weight of $Al_2O_3$, and 10% by weight of $B_2O_3$ was kept in contact with the following liquid, by immersing the glass substrate in the liquid for 60 seconds before the start of the scrubbing step: a liquid obtained by diluting a liquid containing sodium silicate as a main ingredient thereof with water processed with a reverse osmosis (hereinafter abbreviated to "RO") filtering film so as to have an Si element elution of 3 000 ppb/mm². Subsequently, by use of the same liquid as a cleaning liquid, the glass substrate was cleaned by scrubbing on a roll-scrub cleaning machine, and was then dried. The results are shown in Table 1.

COMPARATIVE EXAMPLE 1 (C. E. 1)

An aluminosilicate glass substrate containing as glass ingredients thereof 66% by weight of $SiO_2$ and 15% by weight of $Al_2O_3$ was kept in contact with the following liquid, by spraying the glass substrate with the liquid on spraying equipment for 300 seconds before the start of the scrubbing step: a liquid obtained by diluting an alkaline liquid containing NaOH as a main ingredient thereof with ultrapure water so as to have an Si element elution of 30 ppb/mm². Subsequently, by use of the same liquid as a cleaning liquid, the glass substrate was cleaned by scrubbing on a roll-scrub cleaning machine, and was then dried. The results are shown in Table 1.

COMPARATIVE EXAMPLE 2 (C. E. 2)

A substrate of non-alkali glass containing as glass ingredients thereof 60% by weight of $SiO_2$, 10% by weight of $Al_2O_3$, and 10% by weight of $B_2O_3$ was kept in contact with the following liquid, by immersing the glass substrate in the liquid for 60 seconds before the start of the scrubbing step: a liquid obtained by diluting a liquid containing sodium silicate as a main ingredient thereof with water processed with a reverse osmosis (hereinafter abbreviated to "RO") filtering film so as to have an Si element elution of 30 000 ppb/mm². Subsequently, by use of the same liquid as a cleaning liquid, the glass substrate was cleaned by scrubbing on a roll-scrub cleaning machine, and was then dried. The results are shown in Table 1.

TABLE 1

|  | P. Ex. 1 | P. Ex. 2 | C. Ex. 1 | C. Ex. 2 |
| --- | --- | --- | --- | --- |
| Si Elution (ppb/mm²) | 200 | 3 000 | 30 | 30 000 |
| Duration of Contact with Liquid (Minutes) | 300 | 60 | 300 | 60 |
| Foreign Matter Removal from Substrate Surface | Good | Good | Poor | Poor |
| Substrate Surface Smoothness after Cleaning | Good | Good | Good | Poor |

As will be clear from Table 1, with the fabricating methods of Practical Examples 1 and 2 of the present invention, the foreign matter adhered to the glass substrate surface was removed by scrub-cleaning, and the glass substrate had good surface smoothness. In contrast, in the glass substrate of Comparative Example 1, which was scrub-cleaned by use of a cleaning liquid having a Si elution as low as 30 ppb/mm², although the glass substrate surface had good smoothness after cleaning, foreign matter was found adhered on the glass substrate surface. In the glass substrate of Comparative Example 2, which was scrub-cleaned by use of a cleaning liquid having a Si elution as high as 30 000 ppb/mm², although no foreign matter was found adhered on the glass substrate surface, the glass substrate surface had poor smoothness resulting from erosion thereof by the cleaning liquid.

What is claimed is:

1. A method for fabricating a glass substrate for an information recording medium containing $SiO_2$ as a main ingredient thereof, the method comprising the steps of:
    polishing the glass substrate;
    halting polishing of the glass substrate;
    maintaining a surface of the glass substrate in contact with a liquid for a duration ranging from 60 minutes to 300 minutes, immediately after the polishing is halted, to permit foreign matter adhered to the surface of the substrate to float away from the surface of the substrate;
    the liquid having an Si element elution in a range from 200 to 3,000 $ppb/mm^2$, wherein said Si element elution range is selected to provide a slight erosion of the glass substrate without degrading a surface smoothness of the glass substrate; and
    cleaning by scrubbing the glass substrate subsequent to the step of maintaining.

2. The method according to claim 1, wherein the step of maintaining the surface of the glass substrate in contact with the liquid is performed inside scrub-cleaning equipment.

3. The method according to claim 2, wherein, in the step of maintaining the surface of the glass substrate in contact with the liquid, the liquid is supplied by use of a mechanism for supplying a scrub-cleaning liquid.

4. The method according to claim 1, wherein the surface of the glass substrate is maintained in contact with the liquid with the glass substrate immersed in the liquid which is collected.

* * * * *